1,002,401. PRODUCTION OF ZINC OXID FROM ZINC ORES AND ZINC RESIDUES. Woldemar Hommel, London, England, assignor to Metals Extraction Corporation, Limited, London, England. Filed Nov. 30, 1908. Serial No. 465,283.

*To all whom it may concern:*

Be it known that I, Woldemar Hommel, a citizen of the Swiss Republic, residing at London, in England, have invented certain new and useful Improvements in the Production of Zinc Oxid from Zinc Ores and Zinc Residues, of which the following is a specification.

This invention relates to improvements in the extraction of zinc from ores and zinc residues.

In the previous patent application of Hommel and Sulman Serial No. 401513 is described a process in which roasted ore is mixed with coal and placed in a furnace or blowing hearth containing burning fuel, whereupon air is blown through the heated mass so as to volatilize the zinc (which immediately burns to form zinc oxid) in admixture with other metallic matters and this mixture is subsequently treated for the extraction of the zinc therefrom. The present invention is a modification in detail of that process. In the neighborhood of most zinc works are to be found large quantities of zinc residues (the materials discharged from zinc furnaces after distillation) which contain among other constituents a large proportion of coke or carbonaceous matter and varying proportions of zinc, lead, etc. It is desirable to utilize the fuel therein contained and also to recover the zinc therefrom.

On the other hand in the process of Hommel and Sulman referred to above it is necessary before blowing off the zinc from zinc ore, to mix the roasted ore with carbonaceous matter.

According to this invention a process for extracting zinc from zinc ore and zinc residues containing carbonaceous matter consists in mixing the (preferably roasted) ore with the residues, igniting the mixture in a furnace or blowing hearth, blowing off the zinc contents (which burn to form zinc oxid) together with other metallic matters, collecting the product thus volatilized, treating it with a solution of sulfurous acid so as to obtain a solution of bisulfite of zinc and precipitating the zinc as insoluble monosulfite which is then calcined to produce zinc oxid.

The following is a description by way of example of one method of carrying the invention into effect:—A zinc ore which may for example be a complex ore is first roasted in the usual manner with or without fluxes. The roasted ore is then mixed with zinc furnace distillation residues containing say metallic zinc, metallic iron, zinc silicate, zinc oxid, zinc sulfid, and other metallic matter and also a notable proportion of coke or carbon. The proportion in which the two ingredients are mixed is such that the quantity of carbon shall be sufficient to effect the reduction of all the zinc in the mixture, or additional solid or gaseous fuel may be used. The mixture is introduced into a furnace or blowing hearth containing burning fuel and when the mixture is ignited, air or other suitable gas is blown through the mass so as to blow off the zinc in admixture with other metallic matter. The zinc immediately burns to form zinc oxid which is condensed and collected. The volatilized portion is then treated with a solution of sulfurous acid, and a solution of pure bisulfite of zinc obtained from which insoluble zinc monosulfite is precipitated and calcined to produce zinc oxid.

It is to be understood that the details of the process may be varied without departing from this invention.

What I claim as my invention and desire to secure by Letters Patent is:—

1. The herein described process for recovering zinc from waste zinc furnace distillation residues containing carbonaceous matter, and simultaneously extracting zinc from fresh zinc ore, which consists in mixing the ore with the residues, blowing off the zinc contents together with other metallic matters, collecting the product thus volatilized, treating it with a solution of sulfurous acid so as to obtain a solution of bisulfite of zinc and precipitating the zinc as insoluble monosulfite which is then calcined to produce zinc oxid.

2. The herein described process for recovering zinc from waste zinc furnace distillation residues containing carbonaceous matter, and simultaneously extracting zinc from fresh zinc ore, which consists in roasting the ore, mixing it with the residues, igniting the mixture, blowing off the zinc contents together with other metallic matters, collecting the product thus volatilized, treating it with a solution of sulfurous acid so as to obtain a solution of bisulfite of zinc and precipitating the zinc as insoluble monosulfite which is then calcined to produce zinc oxid.

3. The herein described process for recovering zinc from waste zinc furnace distillation residues containing carbonaceous matter, and simultaneously extracting zinc from fresh zinc ore, which consists in roasting the ore, mixing it with the zinc residues containing sufficient carbon to effect the reduction of all the zinc in the mixture, igniting the mixture, so as to blow off the zinc (which burns to form zinc oxid) in admixture with other metallic matter, collecting the product thus volatilized, treating it with a solution of sulfurous acid so as to obtain a solution of bisulfite of zinc and precipitating the zinc as insoluble monosulfite which is then calcined to produce zinc oxid.

In testimony whereof I have signed my name to this specification in the presence of two subscribing witnesses.

WOLDEMAR HOMMEL.

Witnesses:
  Percy W. H. Higginson,
  F. B. Buss.